(12) United States Patent
Watanabe

(10) Patent No.: US 9,074,913 B2
(45) Date of Patent: Jul. 7, 2015

(54) INSTRUMENT DRIVING DEVICE

(75) Inventor: Masahiro Watanabe, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 283 days.

(21) Appl. No.: 13/821,023

(22) PCT Filed: Aug. 19, 2011

(86) PCT No.: PCT/JP2011/068733
§ 371 (c)(1),
(2), (4) Date: Mar. 6, 2013

(87) PCT Pub. No.: WO2012/035926
PCT Pub. Date: Mar. 22, 2012

(65) Prior Publication Data
US 2013/0160582 A1 Jun. 27, 2013

(30) Foreign Application Priority Data
Sep. 15, 2010 (JP) .................. 2010-206254

(51) Int. Cl.
*G01D 13/22* (2006.01)
*G01D 11/16* (2006.01)
*G01D 11/28* (2006.01)
*H02K 7/116* (2006.01)

(52) U.S. Cl.
CPC .............. *G01D 13/22* (2013.01); *Y10T 74/188* (2015.01); *G01D 11/16* (2013.01); *G01D 11/28* (2013.01); *H02K 7/116* (2013.01)

(58) Field of Classification Search
CPC ........... G01D 11/16; G01R 1/08; H02K 7/116

USPC .................. 116/284, 291, 294, 297; 324/125, 324/154 PB
See application file for complete search history.

(56) References Cited

U.S. PATENT DOCUMENTS 5,267,526 A * 12/1993 Totsuka ................... 116/291
6,538,423 B1 * 3/2003 Sato et al. .................. 324/146

FOREIGN PATENT DOCUMENTS

| JP | 57-24876 | 2/1982 | |
| JP | 61-82284 | 5/1986 | |
| JP | 06034660 A * | 2/1994 | ............... G01R 5/16 |

(Continued)

OTHER PUBLICATIONS

International Search Report based on corresponding PCT Application No. PCT/JP2011/068733 dated Sep. 13, 2011.

*Primary Examiner* — R. A. Smith
(74) *Attorney, Agent, or Firm* — McDermott Will & Emery LLP

(57) ABSTRACT

An instrument driving device includes a magnet which rotates; a driving gear coaxial with the magnet; an output gear driven by the magnet; a needle pointer shaft which has a needle pointer mounted thereon and rotatably supports the output gear; a transmission gear which transmits rotation of the driving gear to the output gear; and a case which accommodates parts of the driving device elements, wherein a stopper and a bearing part which rotatably supports the needle pointer shaft are provided in the case, a protrusion which makes contact with the stopper is formed in the output gear, a contact point with which the needle pointer shaft makes contact is formed in the bearing part, and the end section at the protrusion side of the stopper is in the same position as the contact point in the axial direction of the needle pointer shaft.

4 Claims, 4 Drawing Sheets

(56) References Cited

FOREIGN PATENT DOCUMENTS

| JP | 2001-327149 | 11/2001 | | |
|---|---|---|---|---|
| JP | 2003214911 A | * | 7/2003 | ............ G01D 11/16 |
| JP | 2009-162489 | | 7/2009 | |
| WO | WO 2009084344 A1 | * | 7/2009 | ............... G01R 7/06 |

* cited by examiner

INSTRUMENT DRIVING DEVICE

RELATED APPLICATIONS

This application is the U.S. National Phase under 35 U.S.C. §371 of International Application No. PCT/JP2011/068733, filed on Aug. 19, 2011, which in turn claims the benefit of Japanese Application No. 2010-206254, filed on Sep. 15, 2010, the disclosures of which Applications are incorporated by reference herein.

TECHNICAL FIELD

The present invention relates to an instrument driving device, and more particularly, relates to an instrument driving device with a built-in stopper mechanism.

BACKGROUND ART

There has been known a conventional instrument driving device disclosed in Patent Literature 1. In such an instrument driving device, a rotor including a magnet, which serves as a driving source by multipolar magnetization, and at least one reduction gear, which engages with the rotor, are built in a case, and a needle pointer is mounted on a needle point shaft which is mounted to the reduction gear and protrudes outside the case. As a structure for determining a zero point position, the instrument driving device includes the case provided with a stopper and the reduction gear provided with a protrusion. In addition, when the needle pointer is returned to a zero point, the instrument driving device stops the stopper member and the protrusion in a state (a zero point position) in which the stopper member and the protrusion come into contact with each other. In this case, the rotor is retained so as not to move by attraction to a magnetic member, such as a stator which is not shown, by magnetism.

CITATION LIST

Patent Literature

[PTL 1] Japanese Unexamined Patent Application Publication No. 2001-327149 (particularly see FIG. 3)

SUMMARY OF THE INVENTION

Problems to be Solved by the Invention

A problem that the invention is to solve will be described using schematic views of FIGS. 6 to 8. In the conventional instrument driving device, when an external force acts on the needle pointer or a needle pointer shaft 101 by a vibration, an impact, or the like and the needle pointer shaft 101 is inclined about a lower end thereof by an angle θ1 in an arrow a direction, a reduction gear 102 is also inclined and a protrusion 103 provided in the reduction gear 102 is also inclined. Consequently, the protrusion 103 is displaced by a displacement x in an arrow b direction so as to overlap with a stopper 201.

The protrusion 103 tries to push the stopper 201 from the left to the right of FIG. 7 by the displacement x in the arrow b direction. However, since the stopper 201 is provided in the case and is immovable, the protrusion 103 rotates about the needle pointer shaft 101 from the right to the left of FIG. 8 by an angle θ2 in an arrow c direction as a reaction.

The reduction gear 102 engages with the rotor. The rotation of the rotor is decelerated to be transmitted to the reduction gear 102, whereas the rotation of the reduction gear 102 is accelerated to be transmitted to the rotor. Accordingly, the rotation of the reduction gear 102 by the angle θ2 is accelerated to be transmitted to the rotor.

An angle of the rotor which rotates together with the rotation of the reduction gear 102 upsets the state in which the rotor is stably retained by the attraction to the stator, and the protrusion 103 is separated from the stopper 201 at a position coming into contact with the stopper 201. That is, the state in which the rotor is stably retained by the attraction to the stator, for example, originally, the state in which the needle pointer indicates a "0" scale (not shown in the drawing) by the protrusion 103 coming into contact with the stopper 201 enters a failure state by receiving a vibration, an impact, or the like, and thus the protrusion 103 is separated from the stopper 201 and the needle pointer indicates a position different from the "0" scale (not shown in the drawing). Therefore, there was a problem that so-called a step-out state is reached.

The present invention has been made in view of the above-mentioned problem, and an object thereof is to provide an instrument driving device with which it is possible to suppress a step-out caused by a vibration, an impact, or the like.

Means for Solving the Problem

An instrument driving device of the present invention includes a rotating magnet, a driving gear having the same axis as the magnet, an output gear driven by the magnet, a needle pointer shaft having a needle pointer mounted thereon and rotatably supports the output gear, a transmission gear that transmits rotation of the driving gear to the output gear, and a case that accommodates the magnet, the driving gear, the output gear, the transmission gear, and a portion of the needle pointer shaft, wherein the case is provided with a stopper and a bearing portion that rotatably supports the needle pointer shaft, the output gear is provided with a protrusion that comes into contact with the stopper, the bearing portion is provided with a contact point with which the needle pointer shaft comes into contact, and an end at the protrusion side of the stopper is provided at the same position as the contact point in an axial direction of the needle pointer shaft.

Furthermore, in the present invention, a contact portion having the contact point may have a sectional circular shape in an axial direction of the bearing portion.

Furthermore, in the present invention, a contact portion having the contact point may have a spherical surface shape.

Furthermore, in the present invention, an end of the needle pointer shaft may have a planar surface in a direction perpendicular to the axial direction of the needle pointer shaft.

Effect of the Invention

According to the above-mentioned present invention, it is possible to provide an instrument driving device with which it is possible to suppress a step-out caused by a vibration, an impact, or the like.

MODES FOR CARRYING OUT THE INVENTION

Figure 1:
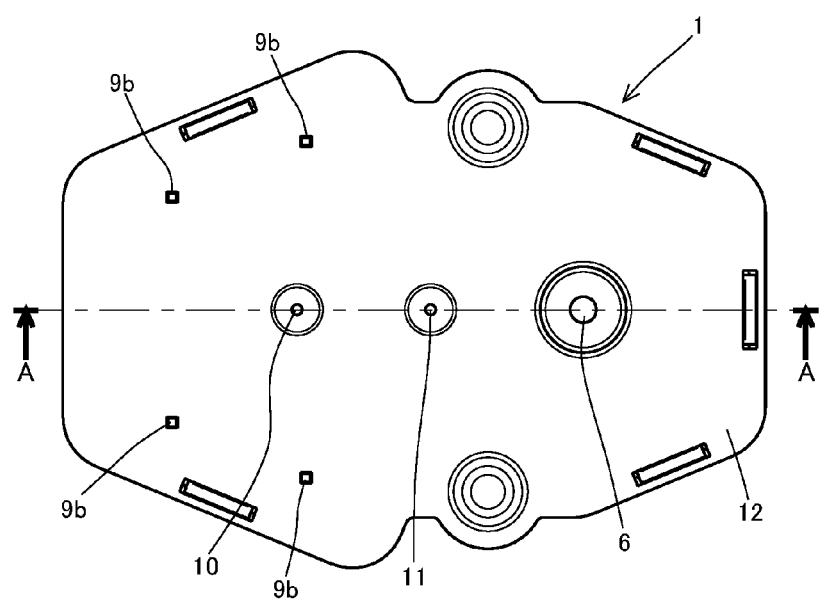
FIG. 1 A top view illustrating an instrument driving device according to an embodiment of the present invention.

An instrument driving device 1 of the present embodiment is a stepping motor which is a kind of electric motor, and is used for an instrument device M including a needle pointer 14 and rotates the needle pointer 14.

The stepping motor 1 of the present embodiment includes a magnet 2, a driving gear 3 which has the same axis as the magnet 2, a transmission gear 4 which has a first gear 4a engaging with the driving gear 3 and a second gear 4b provided on the same axis as the first gear 4a, an output gear 5 which engages with the second gear 4b of the transmission gear 4, two coils 9 which generate a rotating magnetic field to apply a rotational force to the magnet 2, a first rotating shaft 10 which is a rotation center of the magnet 2, a second rotating shaft 11 which is a rotation center of the transmission gear 4, a needle pointer shaft 6 which is a rotation center of the output gear 5, a retention magnet 18, and a case 12 which accommodates the magnet 2, the driving gear 3, the transmission gear 4, the output gear 5, the needle pointer shaft 6, the coils 9, the first rotating shaft 10, the second rotating shaft 11, and the retention magnet 18.

The magnet 2 is made of a synthetic resin including a magnetic material which is referred to as a so-called plastic magnet. The magnet 2 has a doughnut shape which has a through hole at a circular center thereof. The driving gear 3 and the first rotating shaft 10 pass through the through hole. It is sufficient if the magnet 2 includes one or more each of an N-pole and an S-pole. In the present embodiment, the magnet 2 includes four magnetic poles in total of two N-poles and two S-poles, and the magnetic poles are provided so as to be radially uniform about a rotation axis of the magnet 2. Accordingly, the magnetic poles are multipolar-magnetized on an outer peripheral surface of the magnet 2 along a rotational direction thereof using the first rotating shaft 10 as a central shaft.

The driving gear 3 is made of a synthetic resin without magnetism. The driving gear 3 is provided on the same axis as the magnet 2 and rotates together with the rotation of the magnet 2. In addition, the first rotating shaft 10 passes through the driving gear 3.

The transmission gear 4 is made of a synthetic resin without magnetism, and is integrally provided with the first gear 4a and the second gear 4b. The first gear 4a engages with the driving gear 3. In addition, the second gear 4b engages with the output gear 5. In addition, the transmission gear 4 is provided with the second rotating shaft 11 which is a rotation center.

Similarly to the driving gear 3 and the transmission gear 4, the output gear 5 is also made of a synthetic resin without magnetism, and engages with the second gear 4b of the transmission gear 4. The output gear 5 is provided with the needle pointer shaft 6 which is a rotation center.

Figure 2:
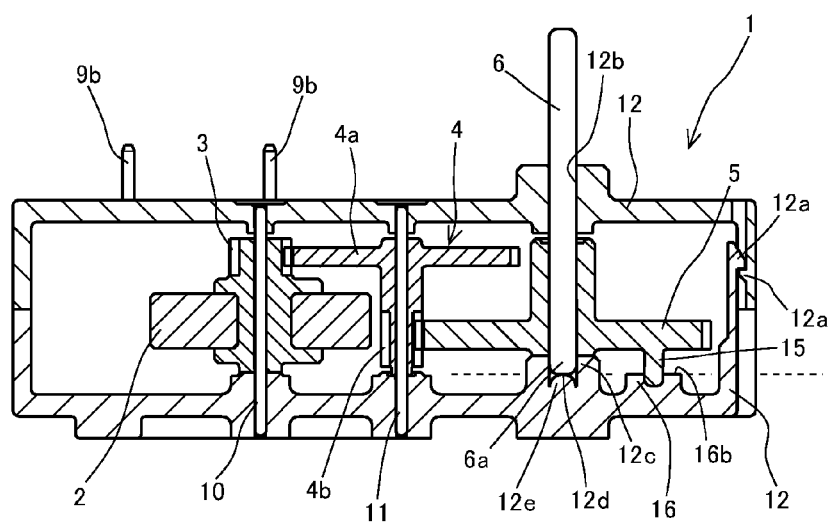
FIG. 2 A cross-sectional view taken along line A-A of FIG. 1.
Figure 3:
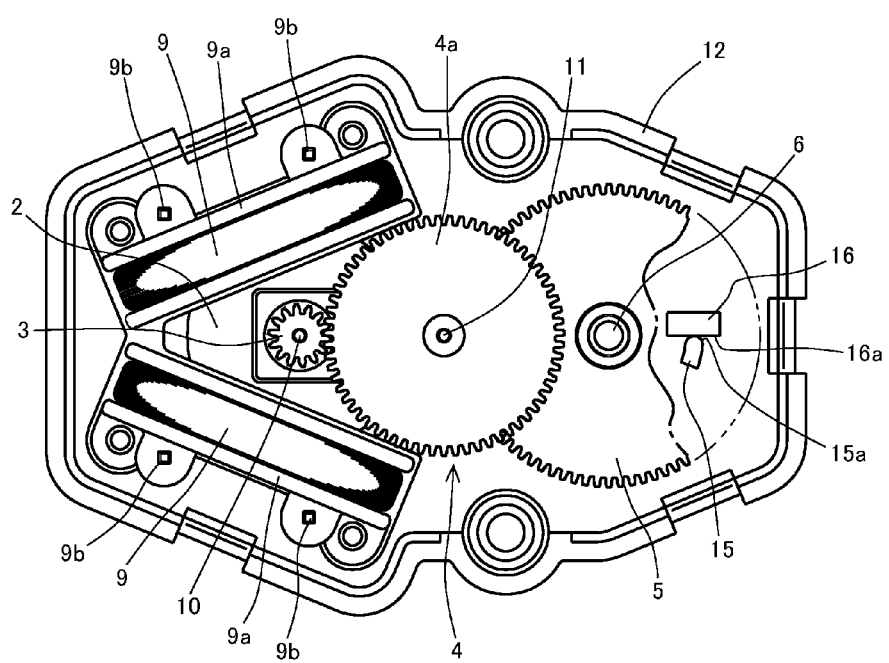
FIG. 3 A top view illustrating an instrument driving device from which an upper case is removed and of which a portion is cut, according to the embodiment.
Figure 4:
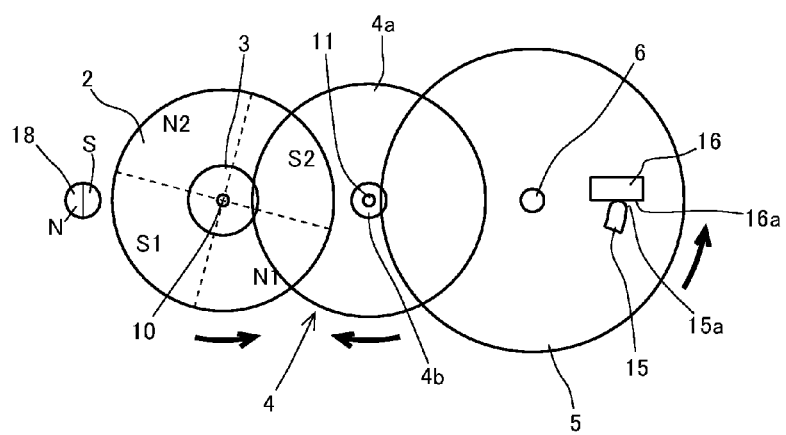
FIG. 4 A schematic view illustrating the principal portions of an instrument driving device when viewed from the top, according to the embodiment.

In FIG. 2, a protrusion 15 is integrally provided on a lower side surface of the output gear 5. The protrusion 15 includes a contact portion 15a which comes into contact with a stopper 16 provided in the case 12 to be described later. The protrusion 15 stops the rotation of the needle pointer shaft 6 at a predetermined position and determines a rotation range of the needle pointer shaft 6, by coming into contact with the stopper 16.

In the present embodiment, a speed reduction mechanism including the driving gear 3, the transmission gear 4, and the output gear 5 is provided, and decelerates the rotation of the magnet 2 to transmit the decelerated rotation of the magnet 2 to the output gear 5.

The needle pointer shaft 6 is axially supported to be rotatable by the case 12, and a portion of the needle pointer shaft 6 protrudes to the outside. Furthermore, an end 6a of the needle pointer shaft 6 has a planar surface in a direction perpendicular to the axial direction of the needle pointer shaft 6.

Each of the coils 9 is to wind a metal wire such as copper having conductivity around a bobbin 9a made of a synthetic resin. The coil 9 is connected to a control unit (not shown) through terminals 9b provided at the bobbin 9a.

The bobbin 9a is a cylinder formed with a through hole having a sectional rectangular shape. The coil 9 is arranged on a periphery of the magnet 2, and a portion of a disk surface of the magnet 2 faces an inner peripheral surface of the through hole in the state in which a portion of the magnet 2 is penetrated into the through hole of the bobbin 9a.

By respectively inputting driving wave patterns, which are output from the control unit, to the two coils 9, the rotating magnetic field is generated at the magnet 2, and the rotational force is applied to the magnet 2. Consequently, the rotation of the magnet 2 is transmitted to the needle pointer shaft 6 to drive the needle pointer shaft 6.

The case 12 is made of a synthetic resin without magnetism, and divided into upper and lower portions. The case 12 divided into the upper and lower portions is fixed by hooking a lock claw 12a provided at each of the upper and lower portions of the case 12.

The case 12 rotatably supports the first rotating shaft 10, the second rotating shaft 11, and the needle pointer shaft 6. Particularly, in order to rotatably support the needle pointer shaft 6, the case 12 includes an upper bearing portion 12b indicative of the middle of the needle pointer shaft 6 and a lower bearing portion 12c to rotatably support the end 6a of the needle pointer shaft 6.

The upper bearing portion 12b is a through hole, and the lower bearing portion 12c is a recessed concave portion. The bottom of the lower bearing portion 12c comes into contact with the needle pointer shaft 6, and includes a contact portion 12e having a contact point 12d which is a support point where the needle pointer shaft 6 is inclined.

The contact portion 12e having the contact point 12d has a sectional circular shape in the axial direction of the lower bearing portion 12c. Furthermore, in the present embodiment, the contact portion 12e having the contact point 12d has a spherical surface shape. The case 12 is integrally provided with the stopper 16 which comes into contact with the protrusion 15 provided on the output gear 5.

The stopper 16 is a protruding three-dimensional object, and includes a contact portion 16a which comes into contact with the protrusion 15. In the present embodiment, the contact portion 15a of the protrusion 15 comes into contact with the contact portion 16b of the stopper 16.

An end 16b at the protrusion 15 side of the stopper 16, that is, a height of the stopper 16 is the same position as the contact point 12d in the axial direction of the needle pointer shaft 6, as indicated by the dotted line in FIG. 2.

The retention magnet 18 is made of a synthetic resin including a magnetic material which is referred to as so-called a plastic magnet, and has a columnar shape. The retention magnet 18 is provided in the vicinity of an outer periphery of the magnet 2. The retention magnet 18 retains a stationary state using a magnetic force when the magnet 2 is static. The instrument driving device 1 of the present embodiment includes the retention magnet 18, as a substitute for the stator which, when the magnet 2 is static, suppresses the rotation of the magnet 2 to carry out a retention function and is made of a magnetic material, similarly to the conventional instrument driving device.

In the present embodiment, the retention magnet 18 includes one each of an N-pole and an S-pole. In the present embodiment, the S-pole side is arranged to be directed toward the magnet 2 side.

In the present embodiment, in the state in which the protrusion 15 of the output gear 5 comes into contact with the stopper 16 of the case 12, a relation between the magnet 2 and the retention magnet 18 corresponds to the state in which the S-pole 51 of the magnet 2 is repelled against the S-pole of the retention magnet 18 and the N-pole N2 of the magnet 2 is attracted to the S-pole of the retention magnet 18. In such a state, a force rotating in an arrow d direction is applied to the magnet 2. The force rotating in the arrow d direction which is applied to the magnet 2 is stably retained in the state in which a force in an arrow e direction is applied to the transmission gear 4, a force in an arrow f direction is applied to the output gear 5, and the protrusion 15 of the output gear 5 comes into contact with the stopper 16.

According to the above configuration, the magnet 2 is stably retained in the stationary state by the magnetic force of the retention magnet 18.

Figure 5:
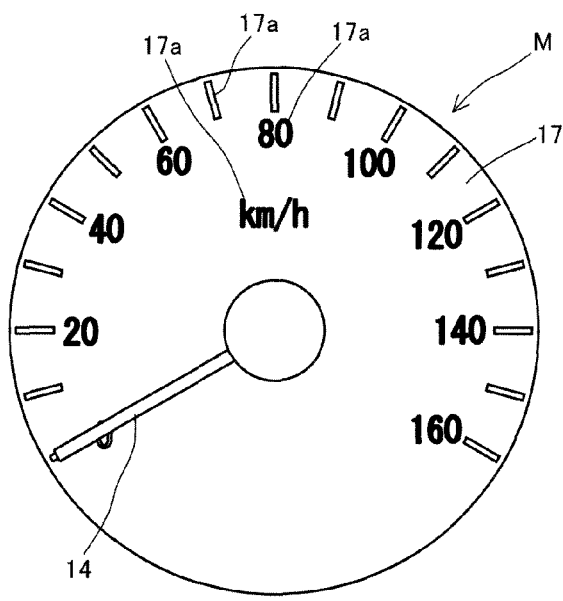
FIG. 5 A front view illustrating an instrument device using an instrument driving device according to the embodiment.
Figure 6:
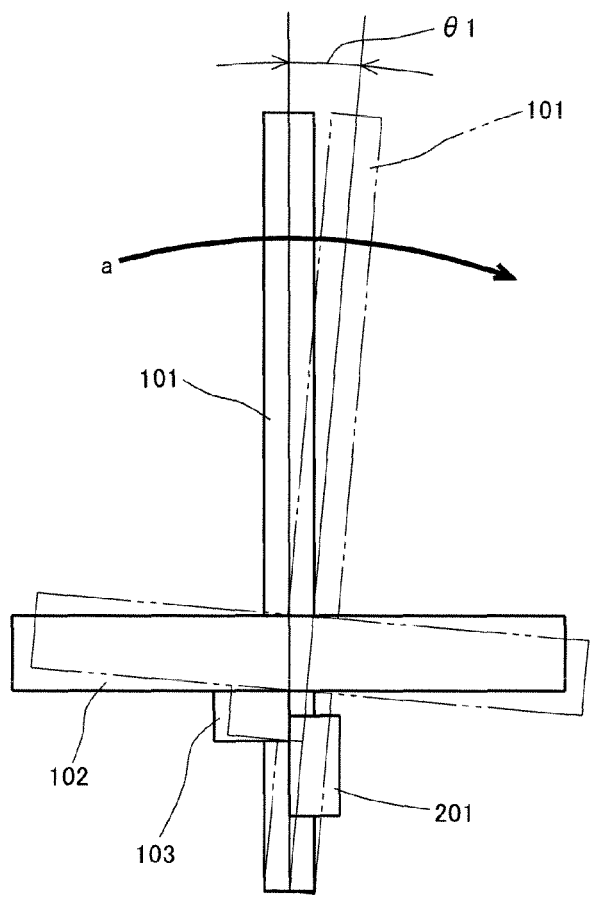
FIG. 6 A schematic view illustrating the principal portions of a conventional instrument driving device when viewed from the side.
Figure 7:
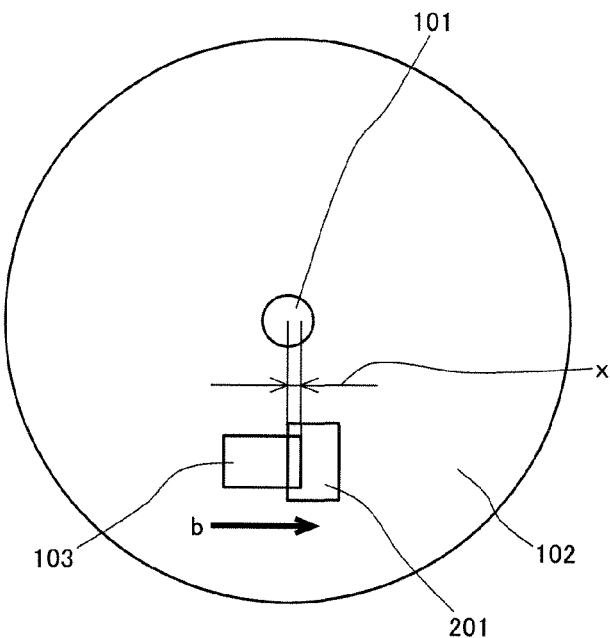
FIG. 7 A schematic view illustrating the principal portions of a conventional instrument driving device when viewed from the top.
Figure 8:
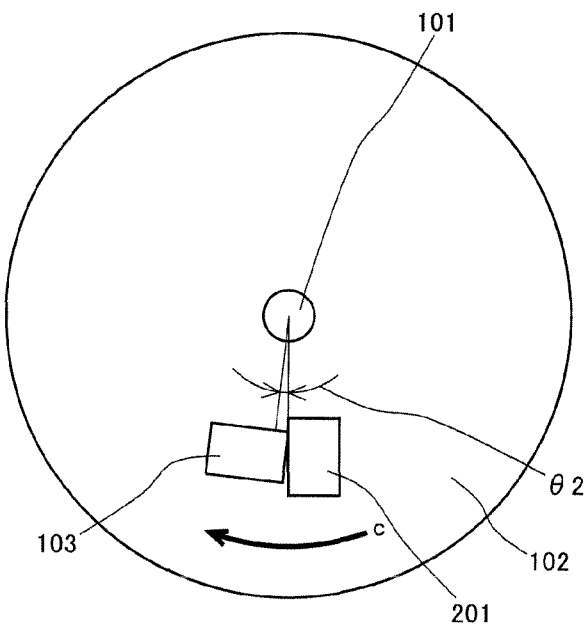
FIG. 8 A schematic view illustrating the principal portions of a conventional instrument driving device when viewed from the top.

FIG. 5 shows that the stepping motor 1 is used for the instrument device M. The instrument device M of the present embodiment indicates a vehicle speed using the needle pointer 14.

The needle pointer 14 is mounted on the needle pointer shaft 6. The needle pointer 14 is provided at the back thereof with a display board 17 which includes an index portion 17a such as a scale or a character indicated by the needle pointer 14. The needle pointer 14 is stopped at a predetermined position, or a position indicative of "0" of the vehicle speed in the present embodiment, by the protrusion 15 and the stopper 16 provided in the stepping motor 1.

The result of the above configuration is that even when an external force such as a vibration or an impact acts on the needle pointer 14 or the needle pointer shaft 6 and thus the needle pointer shaft 6 is inclined about the end 6a of the needle pointer shaft 6 and the protrusion 15 provided on the output gear 5 is inclined, since the contact point 12d provided in the bearing portion 12c and the end 16b at the protrusion 15 side of the stopper 16 are arranged at the same position relative to the axial direction of the needle pointer shaft 6, there is no case where the displacement of the protrusion 15, resulting from the inclination, will not overlap the stopper 16, and as a consequence, it is possible to prevent the protrusion 15 from rotating around the needle pointer shaft 6. Accordingly, it is possible to suppress the rotation of the needle pointer shaft 6 due to a vibration, an impact, or the like, so that it is possible to suppress the rotation of the magnet 2 connected by the transmission gear 4 and the like, resulting in the suppression of a state referred to as so-called a step-out in which the needle pointer 14 indicates a position different from a "0" scale.

INDUSTRIAL APPLICABILITY

The present invention is available for an instrument driving device including a reduction mechanism.

DESCRIPTION OF REFERENCE NUMERALS

1 Instrument driving device (stepping motor)
2 Magnet
3 Driving gear
4 Transmission gear
5 Output gear
6 Needle pointer shaft
12 Case
12c Lower bearing portion
12d Contact point
12e Contact portion
14 Needle pointer
15 Protrusion
15a Contact portion
16 Stopper
16a Contact portion
16b End
18 Retention magnet
M Instrument device

The invention claimed is:

1. An instrument driving device comprising: a rotating magnet; a driving gear having the same axis as the magnet; an output gear driven by the magnet; a needle pointer shaft having a needle pointer mounted thereon and rotatably supports the output gear; a transmission gear that transmits rotation of the driving gear to the output gear; and a case that accommodates the magnet, the driving gear, the output gear, the transmission gear, and a portion of the needle pointer shaft, wherein
   the case is provided with a stopper and a bearing portion that rotatably supports the needle pointer shaft,
   the output gear is provided with a protrusion that comes into contact with the stopper,
   the bearing portion is provided with a contact point with which the needle pointer shaft comes into contact, and
   an end at the protrusion side of the stopper is provided at a same position as the contact point in an axial direction of the needle pointer shaft.

2. The instrument driving device according to claim 1, wherein a contact portion having the contact point has a sectional circular shape in an axial direction of the bearing portion.

3. The instrument driving device according to claim 1, wherein a contact portion having the contact point has a spherical surface shape.

4. The instrument driving device according to claim 2, wherein an end of the needle pointer shaft has a planar surface in a direction perpendicular to the axial direction of the needle pointer shaft.

* * * * *